US010575353B2

(12) United States Patent
Mikelson et al.

(10) Patent No.: US 10,575,353 B2
(45) Date of Patent: *Feb. 25, 2020

(54) PROTECTIVE CONNECTOR AND APPLICATIONS THEREOF

(71) Applicant: The Climate Corporation, San Francisco, CA (US)

(72) Inventors: Christopher Sears Mikelson, Chicago, IL (US); Chad Plattner, Tremont, IL (US)

(73) Assignee: The Climate Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,989

(22) Filed: Feb. 19, 2019

(65) Prior Publication Data

US 2019/0182879 A1    Jun. 13, 2019

Related U.S. Application Data

(63) Continuation of application No. 15/470,724, filed on Mar. 27, 2017, now Pat. No. 10,212,744, which is a
(Continued)

(51) Int. Cl.
*H04W 76/14* (2018.01)
*H04W 4/80* (2018.01)
(Continued)

(52) U.S. Cl.
CPC .......... *H04W 76/14* (2018.02); *H01R 13/533* (2013.01); *H01R 13/625* (2013.01);
(Continued)

(58) Field of Classification Search
None
See application file for complete search history.

(56) References Cited

U.S. PATENT DOCUMENTS 3,182,280 A   5/1965  Daut et al.
3,270,314 A   8/1966  Kohanek et al.
(Continued)

FOREIGN PATENT DOCUMENTS

CA    2770852 A1    2/2011
DE    10217398 A1   1/2003

OTHER PUBLICATIONS

The International Searching Authority, "Search Report" in application No. PCT/US16/33202, dated Aug. 22, 2016, 7 pages.
(Continued)

*Primary Examiner* — Mohammed Rachedine
(74) *Attorney, Agent, or Firm* — Hickman Palermo Becker Bingham LLP (57) ABSTRACT

A protective connector includes a core assembly structure, mating pins and a mating coupling structure. The core assembly structure has circuitry mounted therein. The mating coupling structure substantially encases the core assembly structure and mates with another connector such that the mating pins of the protective connector are electrically coupled to pins of the other connector. The mating coupling structure is mechanically free-moving with respect to the core assembly structure such that forces applied to the mating coupling structure to mate the protective connector to the other connector are not applied to the circuitry within the core assembly structure.

12 Claims, 7 Drawing Sheets farm equipment 10 portable computing device 12

Related U.S. Application Data continuation of application No. 15/158,865, filed on May 19, 2016, now Pat. No. 9,609,112.

(60) Provisional application No. 62/163,721, filed on May 19, 2015.

(51) Int. Cl.

| | | |
|---|---|---|
| *H04B 1/3877* | (2015.01) | |
| *H04B 1/3827* | (2015.01) | |
| *H04M 1/725* | (2006.01) | |
| *H01R 13/625* | (2006.01) | |
| *H01R 13/631* | (2006.01) | |
| *H01R 13/533* | (2006.01) | |

(52) U.S. Cl.
CPC ....... *H01R 13/6315* (2013.01); *H04B 1/3833* (2013.01); *H04B 1/3877* (2013.01); *H04M 1/7253* (2013.01); *H04M 1/72527* (2013.01); *H04M 1/72533* (2013.01); *H04W 4/80* (2018.02)

(56) References Cited

U.S. PATENT DOCUMENTS

| | | | | |
|---|---|---|---|---|
| 6,337,971 | B1* | 1/2002 | Abts | A01G 25/092 |
| | | | | 331/65 |
| 6,554,626 | B2 | 4/2003 | Ramos | |
| 9,179,594 | B2* | 11/2015 | Graham | A01C 7/04 |
| 2010/0274452 | A1 | 10/2010 | Ringwald | |
| 2011/0270485 | A1* | 11/2011 | Jones | B60R 16/02 |
| | | | | 701/31.4 |
| 2012/0050104 | A1 | 3/2012 | Jakab | |
| 2013/0282227 | A1 | 10/2013 | Chen | |
| 2015/0032293 | A1* | 1/2015 | O'Neill | B25J 13/006 |
| | | | | 701/2 |
| 2016/0344859 | A1 | 11/2016 | Mikelson | |
| 2017/0202044 | A1 | 7/2017 | Mikelson | |

OTHER PUBLICATIONS

The International Bureau of WIPO, "Search Report" in application No. PCT/US2016/033202, dated Dec. 7, 2017, 7 pages.
European Claims in Application No. PCT/US16/33202, dated Aug. 2016, 4 pages.
Current Claims in application No. PCT/US2016/033202, dated Dec. 2017, 4 pages.
Mikelson, U.S. Appl. No. 15/470,724, filed Mar. 27, 2017, Office Action, dated Aug. 8, 2017.
Mikelson, U.S. Appl. No. 15/470,724, filed Mar. 27, 2017, Office Action, dated May 18, 2018.
Mikelson, U.S. Appl. No. 15/470,724, filed Mar. 27, 2017, Final Office Action, dated Jan. 31, 2018.
Mikelson, U.S. Appl. No. 15/470,724, filed Mar. 27, 2017, Notice of Allowance, dated Oct. 12, 2018.
Mikelson, U.S. Appl. No. 15/158,865, filed May 19, 2016, Notice of Allowance, dated Nov. 15, 2016.
Brazil Patent Office, "Search Report" in application No. BR112017024503-5, dated Oct. 1, 2019, 2 pages.
Brazil Claim in application No. BR112017024503-5, dated Oct. 2019, 4 pages.

* cited by examiner

PROTECTIVE CONNECTOR AND APPLICATIONS THEREOF

CROSS REFERENCE TO RELATED PATENTS

The present U.S. Utility Patent Application claims priority pursuant to 35 U.S.C. § 120 to U.S. Non-Provisional application Ser. No. 15/470,724, filed Mar. 27, 2017, which claims priority to U.S. Non-Provisional application Ser. No. 15/158,865 filed May 19, 2016, which claims priority pursuant to 35 U.S.C. § 119(e) to U.S. Provisional Application No. 62/163,721, entitled "WIRELESS DRIVE UNIT FOR FARM EQUIPMENT", filed May 19, 2015, the entire contents of both of which are hereby incorporated herein by reference and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to communication devices and more particularly to wireless communication units for farm equipment.

Description of Related Art

Agriculture is known to include cultivation of plants to sustain and enhance human life. The cultivation of plants includes executing numerous steps of the agriculture lifecycle, such as, land management, irrigation, fertilization, planting, and harvesting. Effectiveness of the agriculture lifecycle may depend upon process control of the execution of the numerous steps and further depend upon numerous conditions, such as, available sunlight, water availability, temperature ranges, wind speeds, soil type, soil nutrients, and other factors.

Computing devices are known to gather data, store the data, process the data, and communicate the data. An example of a computing device may be an embedded farming equipment electronic, a smart phone, a tablet computer, a laptop computer, a personal computer, a storage server, and/or a data processing server. Basically, any device that includes a computing unit, one or more interfaces, and a memory system may be deemed a computing device.

As is further known, computing devices may be utilized to gather data associated with the agriculture lifecycle and to process the gathered data. Such processed data may be utilized to understand cause and affect relationships associated with the effectiveness of the agriculture lifecycle.

DETAILED DESCRIPTION OF THE INVENTION

Figure 1:
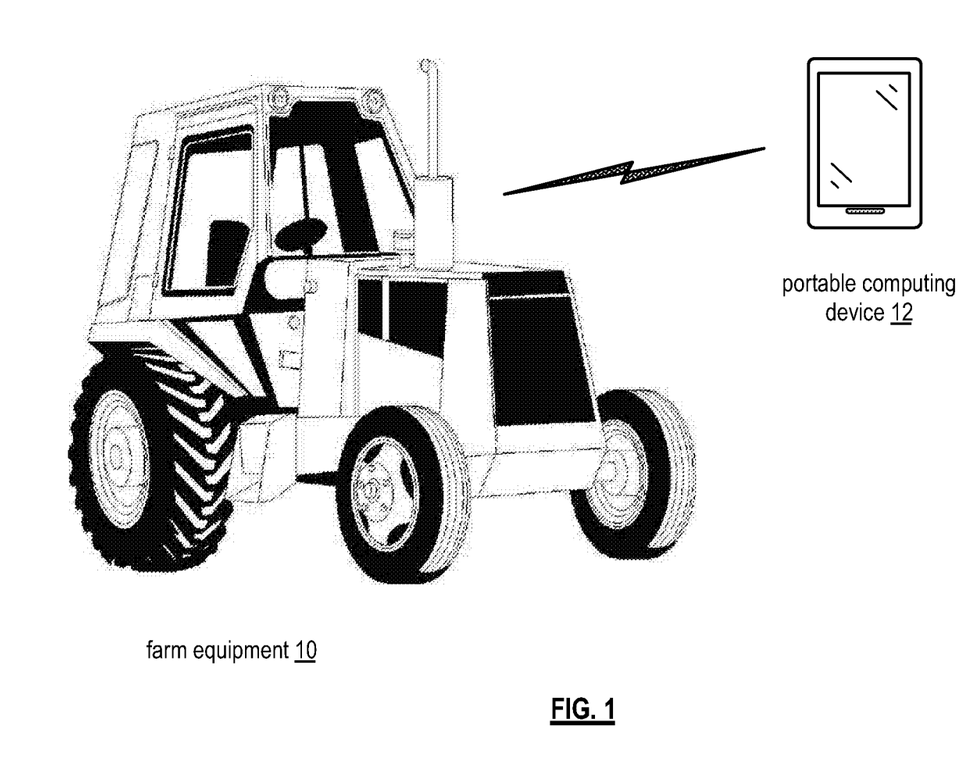
FIG. 1 is a diagram of an example of farm equipment wirelessly communicating with a portable computing device in accordance with the present invention.

FIG. 1 is a diagram of an example of farm equipment 10 wirelessly communicating with a portable computing device 12. The farm equipment 10 may be a tractor, a seed planter, a fertilizer dispenser, a soil tiller, a harvesting machine, and/or any other type of motorized equipment that facilitates the planting, growing, tending, and/or harvesting of an agriculture crop. The portable computing device 12 may be a cellular telephone, a computer tablet, a laptop computer, a computer, and/or any device that includes a processing module, memory, a wireless transceiver, and a user interface.

In an example of operation, the farm equipment 10 is equipped with a wireless drive unit 14 (not shown and is discussed in one or more subsequent figures) that enables the farm equipment 10 to wirelessly communicate with the portable computing device 12. When in wireless communication, the farm equipment 10 can share data with the portable computing device 12 regarding various aspects of farming. For example, the farm equipment captures data (e.g., location information, speed information, terrain information, planting information, fertilizing information, harvesting information, etc.) and provides it to the portable computing device. The portable computing device analyzes the data locally and/or sends the collected data to a processing server (not shown) for analysis.

As another example, the portable computing device 12 sends the farm equipment 10 an agricultural prescription, which is a recommendation regarding one or more agricultural functions (e.g., planting, growing, tending, and/or harvesting). For instance, the agricultural prescription may be a plan for planting a certain crop (e.g., when to plant, how to plant, plant spacing, etc.). In another instance, the agricultural prescription may be a plan for tending to a crop (e.g., when to water and how much; what fertilizer to use, when to use, and how much to use; what nutrients to add to the soil, when to use, and how much to use; when to weed; etc.). These are two of a plurality of agricultural prescriptions that can be generated from collected data and other sources of data (e.g., weather, technical reports, etc.).

Figure 2:
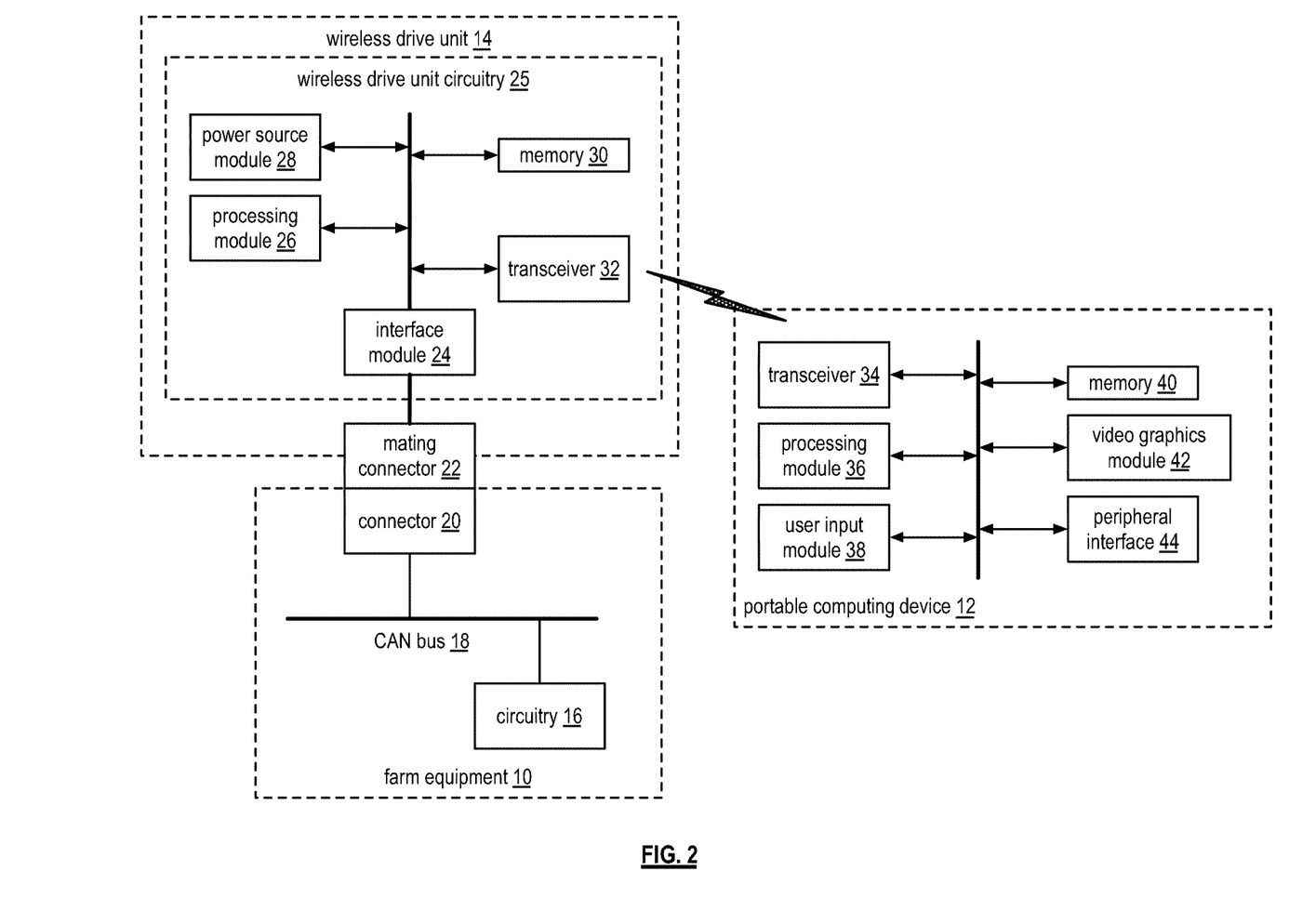
FIG. 2 is a schematic block diagram of an embodiment of farm equipment wirelessly communicating with a portable computing device in accordance with the present invention.

FIG. 2 is a schematic block diagram of an embodiment of farm equipment 10 wirelessly communicating with a portable computing device 12. The farm equipment 10 is shown to include a CAN (controller area network) bus 18 (and/or other type of bus structure), circuitry 16, and a connector 20. The circuitry 16 may include one or more of GPS receiver, sensors, on-board computer, engine control unit, regulators, diagnostic modules, etc. The connector 20 may be a female connector such as a 9-pin deutsch connector.

The portable computing device 12 includes a processing module 36, memory 40, a transceiver 34, a video graphics module 42, a user input module 38, and a peripheral interface 44. The transceiver 34 may be a Bluetooth transceiver, a ZigBee transceiver, a WLAN transceiver, a cellular communications transceiver, and/or any other type of wireless communications transceiver. The user input module 38 may be a keypad, a touch screen, a microphone, and/or any other mechanism for a user to input data, commands, etc., into the portable computing device. The memory includes one or more of read only memory, random access memory, one or more hard drives, solid state memory, and/or cloud storage. The video graphics module 42 is a processing module dedicated for video graphics processing on a video display (not shown). The peripheral interface 44 couples to one or more peripheral devices (e.g., hard drive, USB interface, network interface, flash drive interface, cloud storage interface, etc.).

A wireless drive unit 14 is connected to the connector of the farm equipment 10 and provides the wireless connectivity to the portable computing device 12. The wireless drive unit 14 includes circuitry 25 that, in itself, includes a mating connector 22, an interface module 24, a processing module 26, a transceiver 32, memory 30, and a power source module 28. The transceiver 32 is a corresponding transceiver to the transceiver within the portable computing device. As such, the transceiver may be a Bluetooth transceiver, a ZigBee transceiver, a WLAN transceiver, a cellular communications transceiver, and/or any other type of wireless communications transceiver. The power source module 28 may be a battery, a DC-to-DC converter, and/or any other circuit that provides a DC supply voltage to the components of the wireless drive unit. The interface module 24 may be a driver operating on the processing module to provide the desired signaling protocol with the CAN bus of the farm equipment.

Figure 3A:
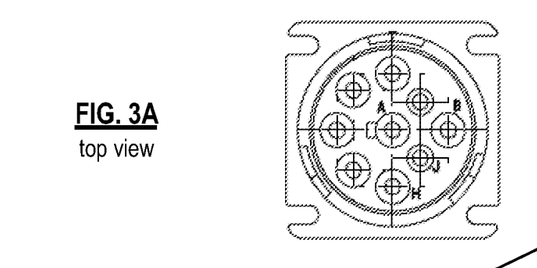
FIGS. 3A-3D are diagrams of an embodiment of a connector used in farm equipment.
Figure 3B:
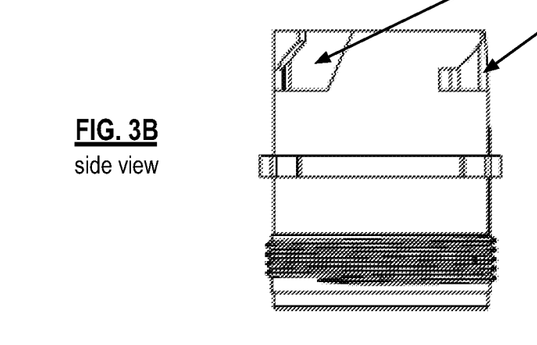
Figure 3C:
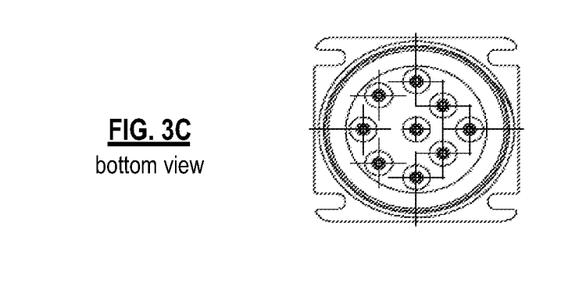
Figure 3D:
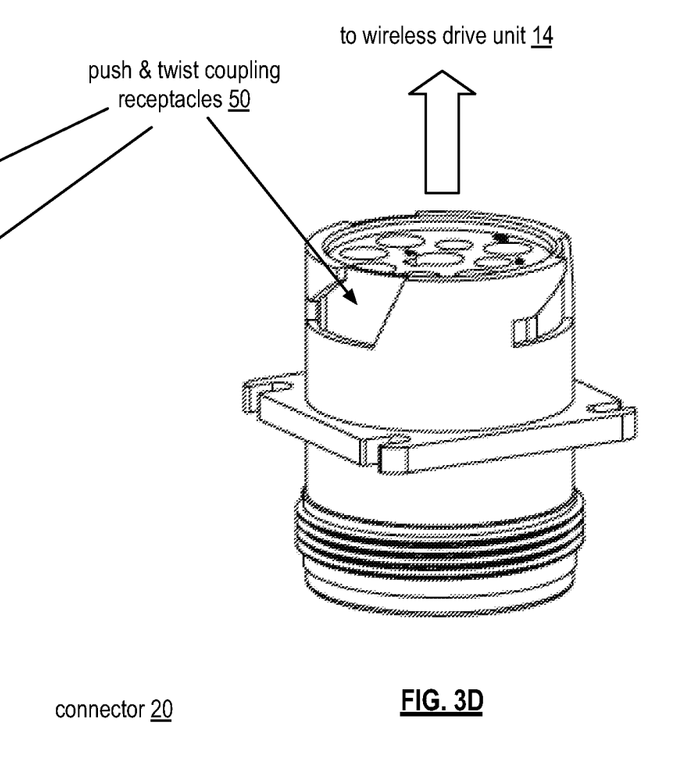

FIGS. 3A-3D are diagrams of an embodiment of a connector 20 used in farm equipment 10. The connector may be a 9-pin female deutsch connector having, as shown in the top view of FIG. 3A, nine female pin receptacles. The threaded bottom portion of the connector, as shown in FIGS. 3B and 3D, is for mechanically coupling to a threaded receptacle in the farming equipment 10. The connector further includes a series of push and twist coupling receptacles 50, as shown in FIGS. 3B and 3D, for coupling to the mating connector 22 of the wireless drive unit 14.

Figure 4:
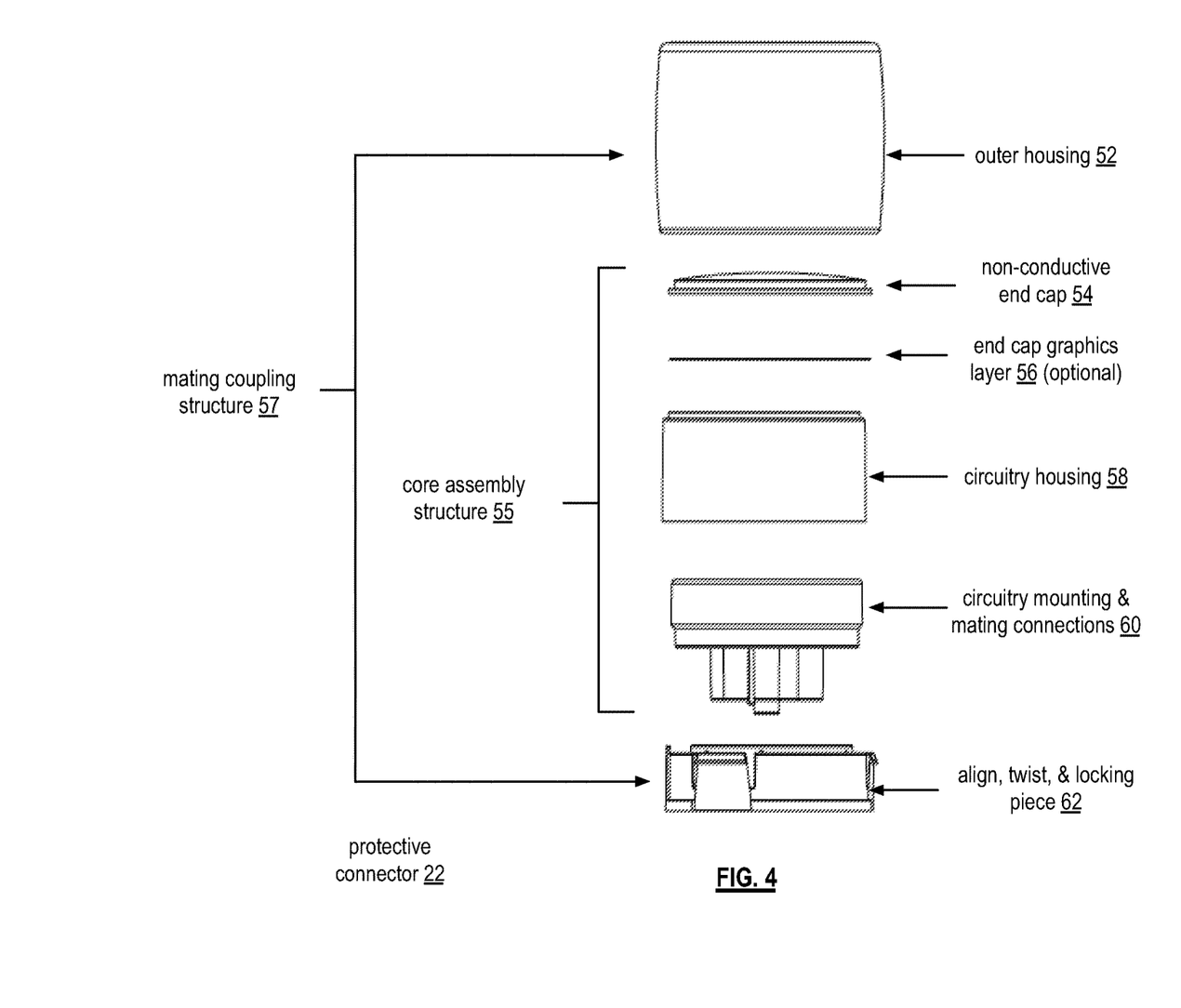
FIG. 4 is an exploded diagram of an embodiment of the mating connector of the wireless drive unit in accordance with the present invention.

FIG. 4 is an exploded diagram of an embodiment of the mating protective connector 22 of the wireless drive unit 14. The mating connector 22 includes a core assembly structure 55, mating pins, and a mating coupling structure 57. The circuitry 25 is mounted within the core assembly structure. The mating coupling structure substantially encases the core assembly structure and mates with a connector of the farm equipment such that the mating pins of the protective connector are electrically coupled to pins of the connector of the farm equipment. In addition, the mating coupling structure is mechanically free-moving with respect to the core assembly structure such that forces applied to the mating coupling structure to mate the protective connector to the connector of the farm equipment are not applied to the circuitry within the core assembly structure.

The mating coupling structure 57 includes an outer housing 52 and an align, twist, and locking piece 62. The core assembly structure 55 includes a non-conductive end cap 54, an optional end cap graphics layer 56, a circuitry housing 58, and a circuitry mounting and mating connections section 60. The outer housing 52 has a tubular shape, fits over the circuitry housing 58 and the circuitry mounting and mating connections section 60, and mechanically couples to the align, twist, and locking piece 62. The outer housing 52 and the align, twist, and locking piece 62 may each be constructed using one or more materials, such as aluminum, stainless steel, plastic, carbon fiber, etc.

Figure 5:
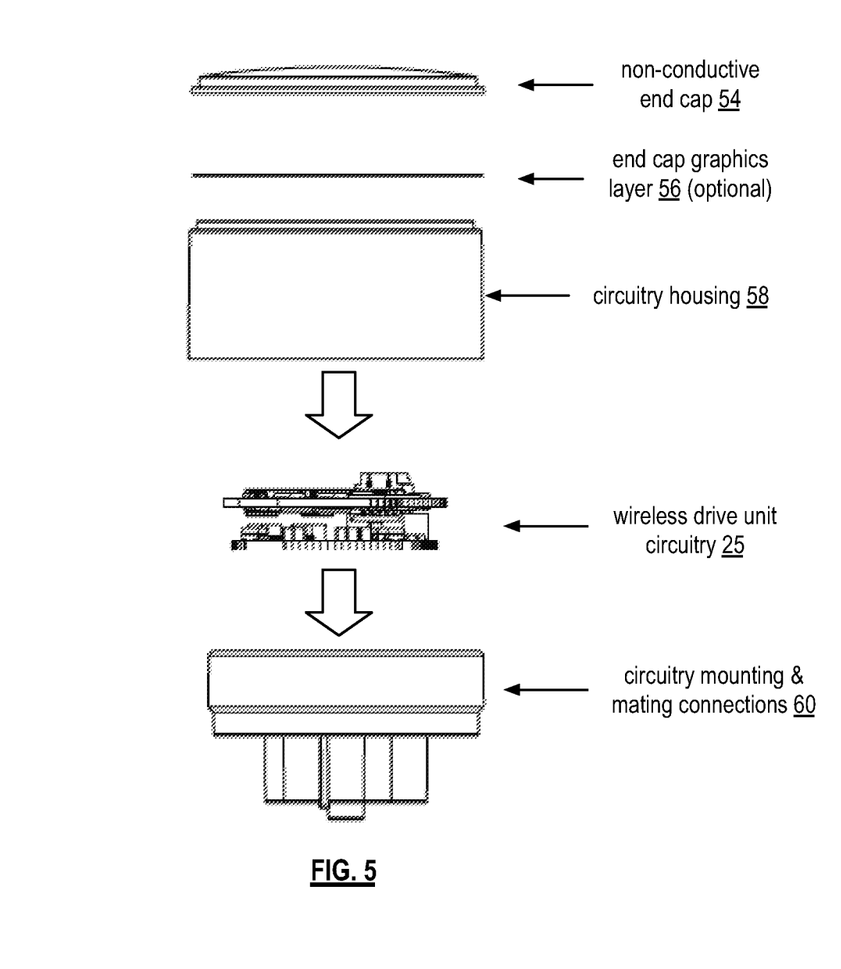
FIG. 5 is an exploded diagram of an example of mounting circuitry of the wireless drive unit in a housing an connector of the wireless drive unit in accordance with the present invention.

The combination of the non-conductive end cap 54, the optional end cap graphics layer 56, the circuitry housing 58, and the circuitry mounting and mating connections section 60 encase the circuitry of the wireless drive unit 14. For example, as shown in FIG. 5, the wireless drive unit circuitry 25 (e.g., the electrical components of the wireless drive unit as shown in FIG. 2) is mounted on one or more printed circuit boards that are securely fastened within the circuitry mounting and mating connections section 60. In addition, the circuitry mounting and mating connections section 60 establishes electrical connections between the pins of the mating connector and the wireless drive unit circuitry.

Figure 6:
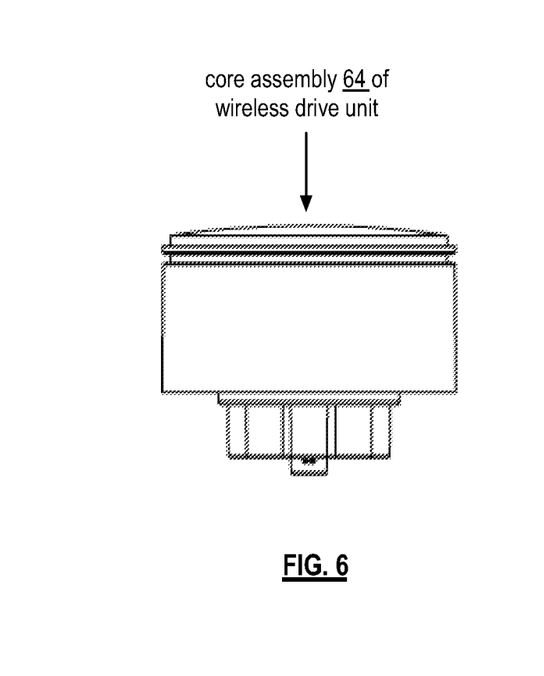
FIG. 6 is a diagram of an example of an assembled wireless drive unit in accordance with the present invention.

Once the wireless drive unit circuitry is securely mounted within the circuitry mounting and mating connections section 60, the circuitry housing 58, non-conductive end cap 54, and the optional end cap graphics layer 56 are coupled to the circuitry mounting and mating connections section 60. This core assembly 64 of the wireless drive unit provides a secure and non-pressure bearing container for the wireless drive unit circuitry. An example of the core assembly of the wireless drive unit is shown in FIG. 6.

The circuitry housing 58 has a tubular shape and may be constructed of one or more materials, such as aluminum, stainless steel, plastic, carbon fiber, etc. To enable the wireless drive unit 14 to wirelessly communicate, the non-conductive end cap 54 is made of a non-conductive material, such as plastic. For example, the non-conductive end cap 54 is comprised of a clear polycarbonate plastic and the graphics layer 56 includes a desired decal (e.g., company logo, a black finish, etc.).

Figure 7:
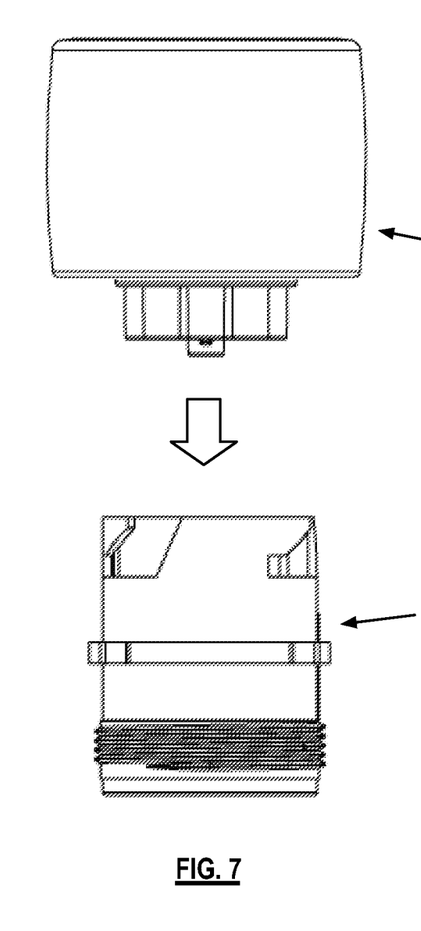
FIG. 7 is a diagram of an example of mating the assembled wireless drive unit to the connector of the farm equipment in accordance with the present invention.
Figure 8:
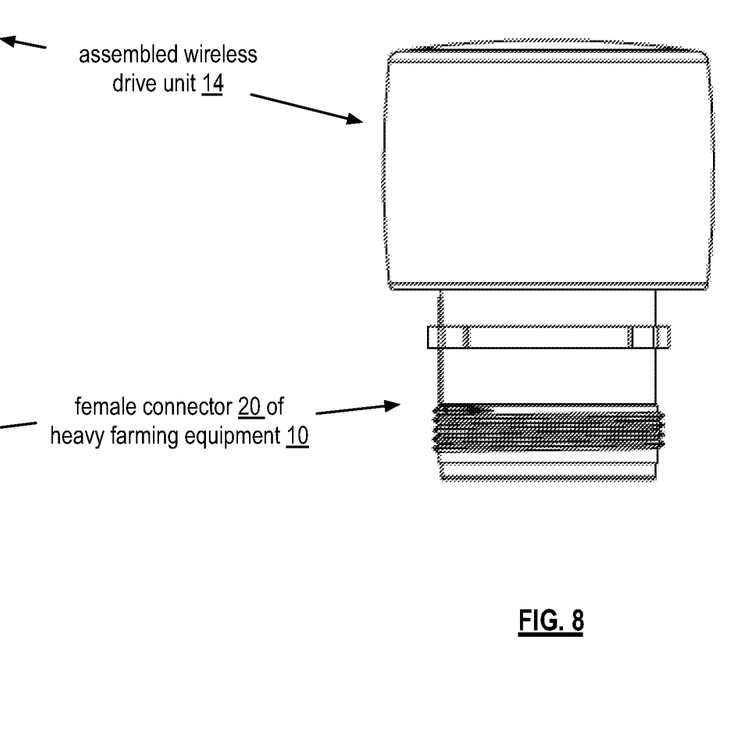
FIG. 8 is a diagram of an example of the assembled wireless drive unit coupled to the connector of the farm equipment in accordance with the present invention.

The outer housing 52 fits over the core assembly 64 of the wireless drive unit 14 and couples to the align, twist, and locking piece 62 to secure the core assembly 64 of the wireless drive unit within the outer housing 52. The outer housing 52 and align, twist, and locking piece 62 freely rotate (at least ten degrees or more) around to the core assembly of the wireless drive unit to allow for a push and twist coupling with the female connector of the farm equipment. An example prior to coupling is shown in FIG. 7 and an example of being coupled is shown in FIG. 8.

With this connector structure for the wireless drive unit 14, when the mating pins are pushed into contact with the receptacles of the female connector of the farm equipment 10, very little, if any, force is applied to the circuitry. Further, when the outer housing 52 is rotated to lock the align, twist, and locking piece into the push and twist receptacles of the female connector, very little to no force is applied on the core assembly 64 of the wireless drive unit. This protects the circuitry and integrity of the connections between the connectors and adds to the longevity of the wireless drive unit.

Figure 9:
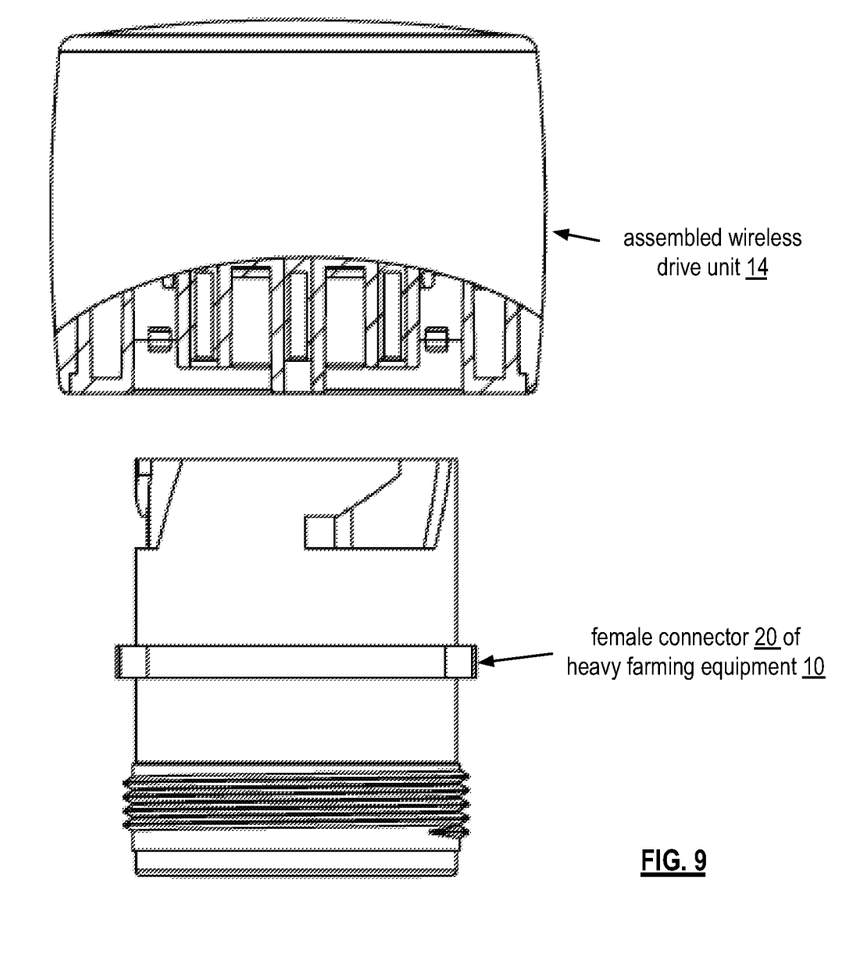
FIG. 9 is a cut-away view diagram of an example of the assembled wireless drive unit coupled to the connector of the farm equipment in accordance with the present invention.

FIG. 9 is a cut-away view diagram of an example of the assembled wireless drive unit 14 coupled to the connector 20 of the farm equipment 10. In this example, the outer housing 52 is partially cut away to illustrate the mating connector 22 of the core assembly and to illustrate a portion of the align, twist, and lock piece.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc., any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system comprising:
    farm equipment comprising a receptacle for attaching a wireless drive unit and mating pins for connecting the wireless drive unit to circuitry of the farm equipment;
    a wireless drive unit comprising mating pins for connecting the wireless drive unit to circuitry of the farm equipment and an outer housing configured to attach the wireless drive unit to the receptacle of the wireless drive unit;
    wherein the wireless drive unit is configured to wirelessly receive prescription data from a portable computing device and transmit the prescription data to the farm equipment to cause the farm equipment to implement a prescription based on the prescription data.

2. The system of claim 1, wherein the wireless drive unit is configured to receive data from the farm equipment and wirelessly transmit the data to a portable computing device.

3. The system of claim 2, wherein the farm equipment is further configured to automatically capture data and send the data to the portable computing device through the wireless drive unit.

4. The system of claim 3, wherein the data captured by the farm equipment includes data regarding operation of the farm equipment.

5. The system of claim 1, wherein the wireless drive unit is configured to wirelessly receive additional data from a portable computing device and transmit the additional data to the farm equipment.

6. The system of claim 1, wherein the prescription comprises a plan for planting a crop.

7. The system of claim 1, wherein the prescription comprises a plan for tending a crop.

8. A wireless drive unit comprising:
    a core assembly structure comprising circuitry;
    a mating coupling structure;
    wherein the wireless drive unit is configured to wirelessly receive prescription data from a portable computing device and transmit the prescription data to connected farm equipment to cause the farm equipment to implement a prescription based on the prescription data.

9. The wireless drive unit of claim 8, wherein the circuitry is configured to receive data from the farm equipment and wirelessly transmit the data to a portable computing device.

10. The wireless drive unit of claim 8, wherein the circuitry is configured to wirelessly receive additional data from the portable computing device and transmit the additional data to the farm equipment.

11. The wireless drive unit of claim 8, wherein the prescription comprises a plan for planting a crop.

12. The wireless drive unity of claim 8, wherein the prescription comprises a plan for tending a crop.

* * * * *